(No Model.)

W. H. JOHNSTON.
VEHICLE BOLSTER.

No. 566,401. Patented Aug. 25, 1896.

Witnesses:
W. C. Coolies
Jno. A. Christianson.

Inventor:
William H. Johnston
By Louis K. Gillson
Atty.

THE NORRIS PETERS CO., PHOTO-LITHO., WASHINGTON, D. C.

UNITED STATES PATENT OFFICE.

WILLIAM H. JOHNSTON, OF BLOOMINGTON, INDIANA.

VEHICLE-BOLSTER.

SPECIFICATION forming part of Letters Patent No. 566,401, dated August 25, 1896.

Application filed August 6, 1895. Serial No. 558,369. (No model.)

*To all whom it may concern:*

Be it known that I, WILLIAM H. JOHNSTON, a citizen of the United States, residing at Bloomington, in the county of Monroe and State of Indiana, have invented certain new and useful Improvements in Vehicle-Bolsters; and I do hereby declare the following to be a full, clear, and exact description of the invention, such as will enable others skilled in the art to which it appertains to make and use the same.

The invention is especially applicable to farm-wagons, though it may be used upon any wagon having a bolster. Its object is to provide the wagon with springs without raising its box; and it consists of a sectional bolster having an upper and a lower plate, springs being interposed between the two plates.

It consists, further, in the peculiar arrangement of the springs.

Figure 1:
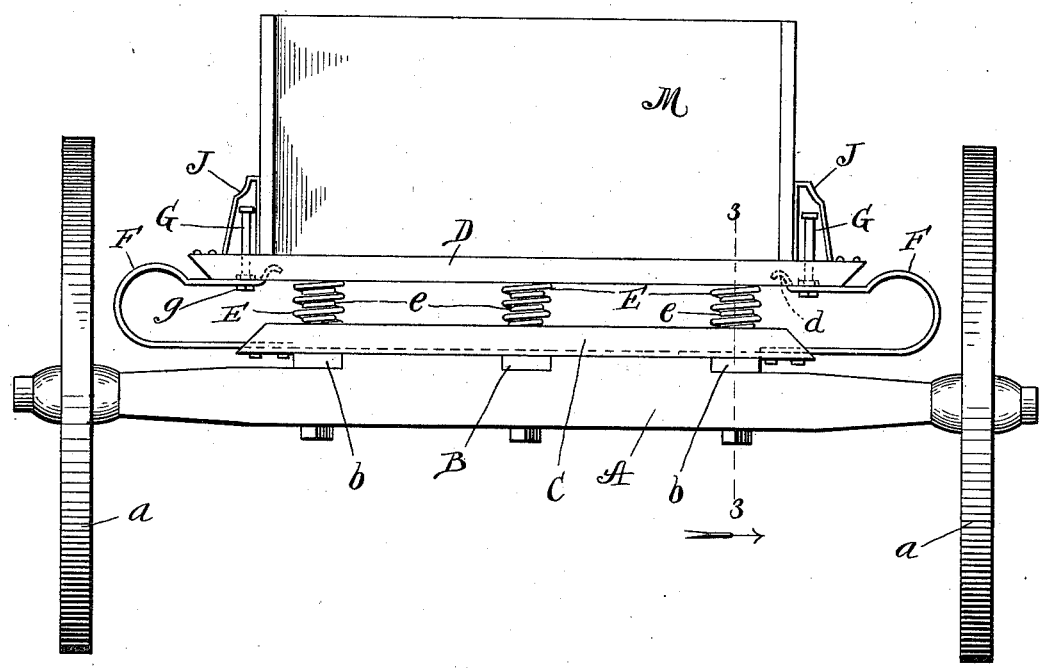
Figure 2:
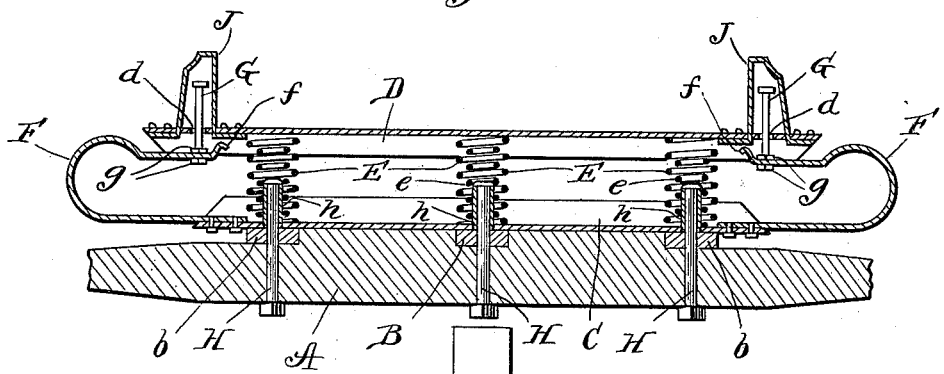
Figure 3:
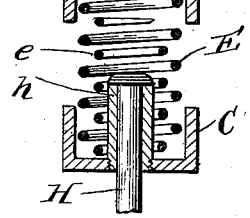

In the accompanying drawings, which form a part of this specification, Figure 1 is a rear elevation of a wagon with my bolster in use thereon. Fig. 2 is a central longitudinal vertical section of the bolster. Fig. 3 is a transverse sectional view on the line 3 3 of Fig. 1.

At A, I show the ordinary axle of a wagon, and $a$ $a$ its wheels. The end of the reach is indicated at B and of the hounds at $b$ $b$.

The bolster consists of the lower and upper plates C D, preferably of channel-steel, the former resting upon the axle A, the latter carrying the body M of the wagon.

Spiral springs E E E are interposed between the two plates C D, and within these springs are placed smaller and shorter spiral springs $e$ $e$ $e$, which reinforce the larger springs when the latter are considerably compressed. Bow-springs F F are also used, one being attached to and projecting beyond each end of the plate C and returning under the plate D, but normally not in contact therewith, the weight of the upper plate D and wagon-body being sustained by the springs E. The extreme ends $f$ $f$ of the springs F F are upturned to receive the impact of the plate D when the springs E are compressed. The springs F are secured to the plate D by means of the bolts G G passing loosely through apertures $d$ $d$ in the plate and rigidly attached to the springs, as by the nuts $g$ $g$. The upper ends of the bolts G are headed, thereby preventing the plate D from being disengaged from them. The standards or stakes J J rise from the plate D and are hollow, and serve as convenient covers for the upper ends of the bolts G.

The lower plate C is bolted to the axle A in any desired manner. I prefer to accomplish this in the manner shown, the bolts H which pass through the axle being set in short tube-sections $h$ $h$ $h$, which are screwed into apertures in the plate and serve as studs for fixing the springs E $e$ in position. The heads of the bolts 4 are of the same diameter as the tubes L, and hence do not interfere with the vertical play of the springs.

The initial pressure being entirely upon the longer springs E, which are made quite light and elastic, the wagon rides very easily without load.

When the wagon is weighted down so as to compress these springs, the smaller ones $e$ are brought into action, materially increasing the resistance, the springs F still further stiffening the tension, the combination of springs thus adapting the vehicle equally well to very light or very heavy service.

The bow-springs allow the wagon-body to sway slightly either laterally or longitudinally, contributing materially to the easy action of the wagon, while securely holding the body in its proper position.

The bolster is capable of being made of the same dimensions as the ordinary wood bolster, so that the wagon-body need not be raised in order to secure the benefit of the springs. The bolster is shown as applied to the rear axle. It is equally applicable to the forward axle without modification.

I claim as my invention—

1. The combination with a wagon of a plate fixed to the axle, spiral springs projecting upwardly from such plate, a plate, D, mounted upon the springs, a hollow stake, J, projecting upwardly from each end of the plate, D, a leaf-spring attached to and projecting beyond each end of the fixed plate and returning under the plate, D, and a bolt, G, fixed in the return end of such spring and projecting loosely through the plate, D, and within the stake, J.

2. The combination of a plate C, adapted to be secured rigidly to the axle of a wagon, a plate D, stakes rigidly fixed to and rising from the ends of the plate D, and bow-springs for supporting the plate D, such springs being fixed to the plate C and disposed longitudinally with reference thereto, the longitudinal movement of the plate D being limited only by the tension of the springs, substantially as described and for the purpose set forth.

3. In a vehicle-bolster the combination with the plates C, D, adapted respectively to the axle and body of the vehicle stakes mounted upon the upper plate, of the springs E interposed between the plates and in constant bearing-contact with each, the springs e adapted to reinforce the springs E when the latter are partially compressed, and the bow-springs F secured to and projecting beyond the ends of the plate C and returning under the plate D, whereby the said plate D is capable of longitudinal reciprocation substantially as described and for the purpose specified.

4. The combination with the plates C, D, of the spiral springs interposed therebetween, and the bow-springs secured to and projecting beyond the ends of the plate C and returning under the plate D, but normally not in contact therewith bolts G rigidly set in the ends of the springs F projecting upwardly and loosely through the plate D, and stakes mounted upon the plate D, substantially as described and for the purpose specified.

In testimony whereof I affix my signature in presence of two witnesses.

WILLIAM H. JOHNSTON.

Witnesses:
  LOUIS K. GILLSON,
  SPENCER WARD.